United States Patent [19]

Rhum et al.

[11] Patent Number: 4,650,851
[45] Date of Patent: Mar. 17, 1987

[54] PURIFICATION OF GLYCOLIDE

[75] Inventors: David Rhum, Old Lyme; Richard S. Matthews, North Stonington, both of Conn.

[73] Assignee: Pfizer Hospital Products Group, Inc., New York, N.Y.

[21] Appl. No.: 841,489

[22] Filed: Mar. 19, 1986

[51] Int. Cl.$^4$ ............................................. C08G 63/02
[52] U.S. Cl. .................................. 528/354; 549/274; 128/335.5; 210/689
[58] Field of Search ................ 210/689, 690; 549/274; 528/354

[56] References Cited

U.S. PATENT DOCUMENTS

| | | | |
|---|---|---|---|
| 3,297,033 | 1/1967 | Schmitt et al. | 128/335.5 |
| 3,435,008 | 3/1969 | Schmitt et al. | 528/354 |
| 3,442,871 | 5/1969 | Schmitt et al. | 528/357 |
| 3,457,280 | 7/1969 | Schmitt et al. | 549/274 |
| 3,463,158 | 8/1969 | Schmitt et al. | 128/334 R |
| 3,763,190 | 10/1973 | Ross et al. | 549/274 |
| 4,387,264 | 6/1983 | Bi | 210/689 |

Primary Examiner—Richard V. Fisher
Assistant Examiner—Jeffrey W. Peterson
Attorney, Agent, or Firm—Charles J. Knuth; Peter C. Richardson; Mark Dryer

[57] ABSTRACT

A process for the purification of glycolide which comprises dissolving the glycolide to be purified in a suitable organic solvent, adding alumina to the resulting solution to form a slurry wherein the alumina is in intimate contact with the dissolved glycolide, stirring the slurry under controlled conditions for a period of 1 to 60 minutes, and filtering to remove the alumina and, if desired, evaporating to remove the solvent and recovering the purified glycolide; and the production of suture-grade polyglycolic acid by the polymerization of the resulting purified glycolide.

10 Claims, 1 Drawing Figure

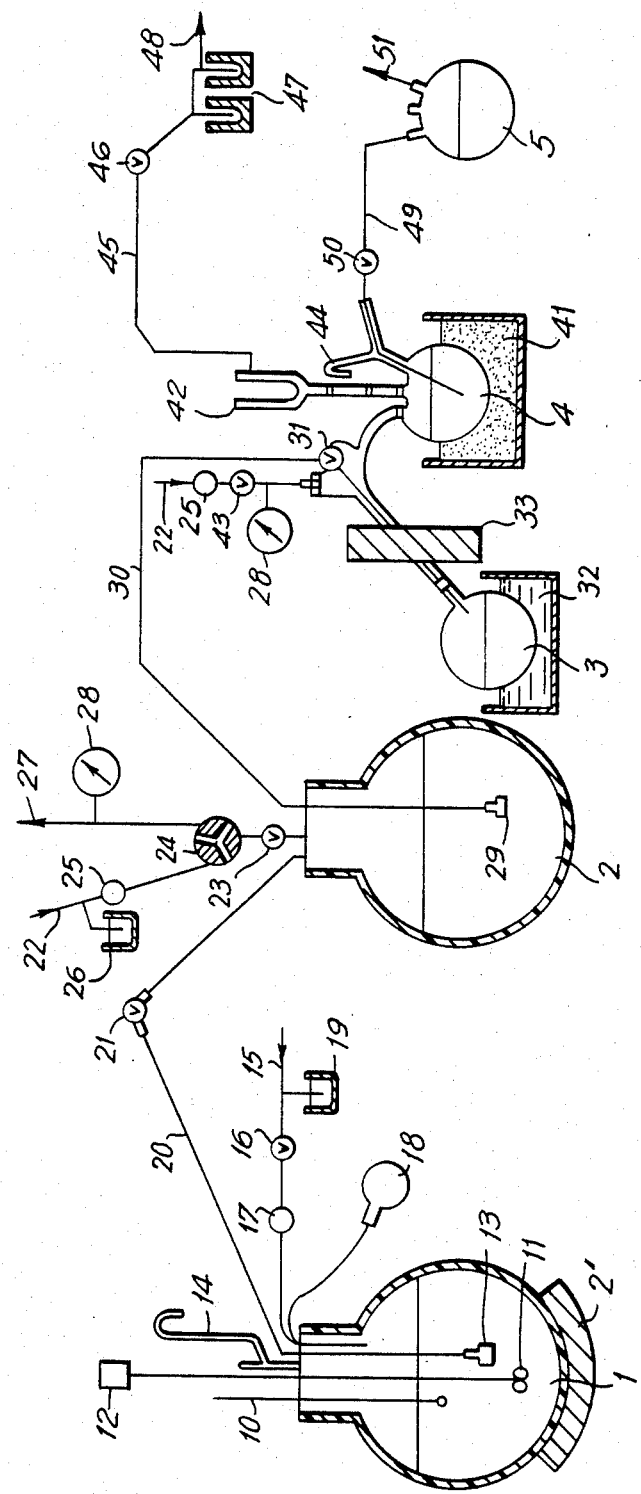

PURIFICATION OF GLYCOLIDE

BACKGROUND OF THE INVENTION

This invention relates to the purification of glycolide. More particularly, the invention is concerned with the purification of commercially available glycolide to a purity which maks it suitable for the production of suture-grade polyglycolid acid.

It is known that polyglycolic acid (PGA), also known as polyhydroxyacetic acid, is a suitable material for synthetic absorbable sutures to replace the traditional collagen ("catgut") sutures. Among the advantages of using synthetic polymers over the previously used collagenous material are predictable formability and consistency in characteristics, such as absorbability and stiffness. Of the various synthetic materials which have been suggested for the production of sutures, polyglycolic acid is particularly suitable because of a number of desirable characteristics including handleability, strength, non-toxicity, sterility and absorbability. Regarding absorbability, it is desirable that a suture material retains its strength long enough for the wound to heal before substantial absorption occurs and that an appropriate grade of polyglycolic acid be chosen so as to give the desired rate of absorption. It has been found that polyglycolic acid having an inherent viscosity, $\eta$ inh, of 1.1 to 1.6, preferably about 1.3, has the required characteristics for sutures.

Numerous references relating to the production and use of sutures made from polyglycolic acid have been published in the art. Exemplary of such references is U.S. Pat. No. 3,297,033, to Schmitt et al, which discloses the production of a synthetic absorbable surgical suture from a polyhydroxyacetic ester. The Schmitt et al Patent also discloses that a preferred route for the preparation of the said polyhydroxyacetic ester involves the polymerization of glycolide:

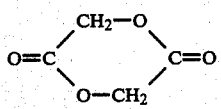

the cyclic dimeric condensation product formed by dehydrating hydroxyacetic acid.

According to U.S. Pat. No. 3,297,033 the polymerization of glycolide occurs by heating with or without a catalyst, or may be induced by radiation such as x-rays, gamma rays or electron beams. The catalyst disclosed in this Patent is antimony trifluoride.

Another process for polymerizing a glycolide is disclosed in U.S. Pat. No. 3,442,871, also to Schmitt et al. This patent discloses the polymerization of a substantially pure glycolide, which may be α-glycolide alone, or β-glycolide alone or a mixture of the α- and β-glycolide isomers, which comprises heating a mixture containing the glycolide and from about 0.05 to 1.5 mole percent of an alcohol free of non-benzenoid unsaturation, e.g. lauryl alcohol, in the presence of a minor proportion of $SnCl_2.2H_2O$ as catalyst. U.S. Pat. No. 3,442,871 further emphasizes the requirement that the glycolide be "substantially pure" to provide, upon polymerization, polyglycolic acid of a suitable standard for use in sutures (herein referred to as "suture-grade" polyglycolic acid).

The preparation of glycolide in an appropriate "pure" form for polymerization to suture grade polyglycolic acid also has been the subject of intensive research in the art; and, here again, there is an extensive number of patent references relating to the production of "pure" glycolide. Illustrations of such references are U.S. Pat. Nos. 3,435,008, to Schmitt et al; 3,457,280, to Schmitt et al; and 3,763,190, to Ross et al.

It is clear from the above references that the purification of glycolide is of prime importance if the polyglycolic acid prepared by the polymerization thereof is to be suitable for the production of sutures. Paradoxically, if the glycolide is too pure the polyglycolic acid resulting from the polymerization thereof is unsuitable for sutures because of difficulty in extrusion. The glycolide of satisfactory purity is that which will provide polyglycolic acid having an inherent viscosity of 1.1 to 1.6 and suture-grade polyglycolic acid is defined herein as polyglycolic acid having said inherent viscosity.

Commercially available glycolide is not sufficiently pure to provide suture grade polyglycolic acid upon polymerization. Typical contaminants are free acid (glycolic acid) and free water, and polyglycolic acid produced by the polymerization of said glycolide typically has an inherent viscosity of about 0.8.

Surprisingly, it has now been found that said commercially available glycolide can be purified in a manner which results in losses of no more than 1 to 10% as compared with about 25 to 50% in the prior art, and consequently is much less costly than conventional distillation methods and more simple than other complex methods disclosed in the prior art; these benefits are obtained by treatment with alumina under carefully controlled conditions.

SUMMARY OF THE INVENTION

In accordance with the present invention there is provided a process for the purification of glycolide which comprises dissolving the glycolide to be purified in a suitable organic solvent, adding alumina to the resulting solution to form a slurry wherein the alumina is in intimate contact with the dissolved glycolide, stirring the slurry under controlled conditions for a period of 1 to 60 minutes, and filtering to remove the alumina and, if desired, evaporating to remove the solvent and recovering the purified glycolide.

One of the reasons that the achievement of a proper degree of purification of glycolide has proved to be elusive or different in the prior art is that the reactivity of glycolide, particularly for polymerization purposes, is very sensitive to the presence of the aforesaid acid and water impurities and unless the alumina treatment is carried out under carefully controlled conditions, particularly with respect to the time of contact, the desired degree of purification will not be achieved.

For example, the desired degree of purification is not achieved by simply passing the glycolide through an alumina-containing column; nor is the desired purification achieved if the contact with alumina is prolonged beyond the specified time limit. In such a case the glycolide will be degraded and the polyglycolic acid resulting from the polymerization thereof will be unsuitable for sutures.

In carrying out the process according to the invention, preferably the ratio of glycolide to alumina is from 1:0.01 to 1:10, by weight and said controlled conditions are such that the amount of alumina used is correlated to the contact time, such as the duration of stirring.

The preferred solvent is methylene chloride or tetrahydrofuran, and the process preferably is carried out under a dry inert atmosphere, for example, nitrogen.

A particularly preferred embodiment of the invention comprises dissolving about one part by weight of the glycolide to be purified in methylene chloride, for example about 5% w/v, adding to the resulting glycolide solution about 0.1 part by weight of granulated alumina and stirring the resultant slurry for about 30 minutes, filtering to remove the alumina, evaporating the methylene chloride and drying the wet, purified glycolide so obtained under vacuum at a temperature of 45° to 50° C.

Glycolide which has been purified by the process of the invention is particularly suitable for the preparation of suture-grade polyglycolic acid and the invention additionally provides a process for the production of suture-grade polyglycolic acid which comprises polymerizing the purified glycolide prepared by the process described herein.

The polymerization of the glycolide may be conducted by a procedure conventional in the art, for example, by heating with dodecyl alcohol and $SnCl_2.2H_2O$ catalyst; and it is to be understood that the polymerization step, in and of itself, is not claimed to be inventive. However, the process, as a whole, for the production of the polymer is novel by virtue of the use, as starting material, of the glycolide purified by the novel process of the invention.

DETAILED DESCRIPTION OF THE INVENTION

The invention may be particularly described with reference to a preferred embodiment which involves the following sequence of operating steps; it being understood that the parameters given by way of example may be varied without departing from the spirit and scope of the invention:

The glycolide to be purified, for example commercially available glycolide obtained from Boehringer-Ingelheim, in 500 gram batches is dissolved in methylene chloride (e.g. about 5% w/v solution of Fisher Scientific A.C.S. grade). The resulting glycolide solution is then slurried with alumina (e.g. neutral alumina from Woelm Pharma, Activity I, re-dried at about 300° C./$10^{-5}$ torr for about 3 hours). For example, when using alumina in a ratio, alumina/glycolide, of 0.10:1.0 the duration of this slurrying step is about 30 minutes. The solution is then filtered to remove the alumina, followed by evaporation of the methylene chloride solvent. If desired, the resulting wet glycolide is dried under vacuum at about 50° C.

In carrying out the above general procedure it is desirable that all parts of the apparatus used, i.e. glassware, transfer lines and filters, should be maintained in a clean and dry condition. In particular, it is preferred that the process be conducted under a dry inert atmosphere, preferably nitrogen.

BRIEF DESCRIPTION OF THE DRAWING

Suitable apparatus for carrying out the preferred embodiment of the invention is illustrated schematically in the accompanying drawing.

Referring to the drawing, the apparatus comprises two 12 liter flasks 1, 2 and three 5 liter flasks 3, 4, 5.

Flask 1 is a 12 liter resin kettle mounted on a heating mantle 2' and equipped with a thermometer 10, a stirrer 11 operated by a motor 12, a filter 13, which is a modified fritted glass funnel of 2.5 inch diameter, and a tube condenser 14 provided with a drying agent at its distal end.

Nitrogen gas is introduced into flask 1 through line 15 by opening valve 16. The flow of nitrogen is monitored through a bubbler 17 and pressure relief is provided by balloon 18 and valve 19.

Liquid is transferred from flask 1 to flask 2 through polytetrafluoroethylene tubing 20 via valve 21.

Nitrogen gas is introduced into flask 2 and flask 3 through line 22 via valve 23 and 43. A three-way valve 24 connects the line 22 to flask 2 with a vacuum line described below. Valve 23 thus controls both the nitrogen line and the vacuum line. The flow in line 22 is monitored through a bubbler 25 and pressure relief is provided by valve 26.

The liquid flow is achieved by applying a vacuum to the apparatus through vacuum manifold 27. The vacuum line has a three-way valve 24 and the pressure is monitored through a pressure/vacuum gauge 28.

The liquid is transferred from flask 2 through a medium porosity gas dispersion tube filter 29 and transfer line 30, which is polytetrafluoroethylene tubing. The liquid passing through transfer line 30 is delivered to flask 3 through a valve 31 which controls the rate of feed. Flask 3 is maintained in a heated water bath 32.

Condensate from flask 3 is passed via a rotary evaporator 33 into flask 4, which is maintained in a bath of dry ice, 41.

Flask 4 is equipped with dry ice condenser, 42, and drying tube 44 containing a drying agent.

Vacuum is applied to the dry ice condensers through line 45, valve 46 and dry ice traps 47 from vacuum manifold 48, with 44 plugged.

Solvent is removed from flask 4 when it is full through line 49 by applying vacuum through vacuum manifold 51, and valve 50.

The following Example illustrates a preferred embodiment of the invention involving an operating procedure using the apparatus described above.

EXAMPLE 1

All glassware, transfer lines, filters and other pieces of equipment throughout the apparatus were carefully cleaned and dried and the apparatus was maintained under a dry nitrogen atmosphere before and during the process.

10 liters of methylene chloride were charged to flask 1 by pulling low vacuum on flask 2, opening the valve 21 on the transfer line 20 to pull sufficient vacuum on flask 1 so that solvent was pulled into flask 1 from its container. The solvent was transferred from its bottle to flask 1 through polytetrafluoroethylene tubing replacing the solvent with nitrogen in the solvent bottle. When completed, the system was returned to a nitrogen atmosphere.

500 g. of glycolide to be purified was charged rapidly to flask 1 through a power funnel, while maintaining the flask under a nitrogen atmosphere.

The suspension of glycolide in methylene chloride was stirred and the flask was heated with the heating mantle. When the solution began to boil (40° C.), the heat was turned off and the solution allowed to cool to ambient temperature, about 20° C., (overnight if necessary). A small amount of undissolved powdery solid was observed.

50.0 g. of alumina was added to the glycolide solution through a powder funnel, keeping the flask under nitrogen. The solution was stirred for 30 minutes, assuring that the alumina was dispersed throughout the solution.

Stirring of the solution was stopped and the alumina allowed to settle for 5-10 minutes.

The filtering device, 13, a fritted glass funnel, was lowered into the glycolide solution in flask 1. A vacuum of 10-15" mercury was pulled on flask 2, then the valve, 21, in the polytetrafluoroethylene tubing transfer line 20 was opened. The glycolide solution was thereby filtered and transferred to flask 2, leaving behind the alumina and insolubles in flask 1. When the transfer of the glycolide was completed, the system was put back under nitrogen atmosphere. This procedure (filtering) took 45 minutes to 1 hour. Dry ice was charged to the rotovapor condensers, condensate receiving flask 4 cooling tank, and traps. The tubing liquid transfer line 30 with filter 29 was lowered into flask 2. The five liter flask 3 was turned at 70-90 rpm in the water bath, 32, heated to 45°-50° C.

10-15" mercury vacuum was pulled on the rotary evaporator, slowly transferring the glycolide solution to the five liter flask 3 through valve 31 and simulataneously evaporating the solvent from flask 3 as it enters. The methylene chloride evaporated and was condensed by the dry ice condensers, and the condensate was collected in receiving flask 4. Glycolide crystallized as a slurry in the flask 3 during solvent removal.

When condensate receiver flask 4 was filled, the vacuum on the rotary evaporator system was released with dry nitrogen. Flask 4 was drained by pulling vacuum on an external flask 5 and transfering the solvent wastes through polytetrafluoroethylene tubing to the external flask. The vacuum was resumed and solution fed to the rotary evaporator system when the condensate receiver, flask 4, was empty.

When the methylene chloride evaporation was finished, as shown by slowdown in condensation rate from condensers, the vacuum on the rotary evaporator system was released with nitrogen. The five liter flask 3 containing the glycolide product, was removed, the opening quickly capped and the glass wiped free of water. The glycolide crystals in the flask were wet with unevaporated methylene chloride. The flask was placed in a vacuum oven.

The glycolide in flask 3 was dried overnight at 45°-50° C. and 30" mercury vacuum.

The glycolide was removed from the flask and packaged in a dry nitrogen atmosphere, in heat-sealed laminated bags packed inside other heat sealed bags containing a drying agent. The bags were stored in a freezer until needed for polymerization.

The packages were defrosted in absolutely dry atmosphere, e.g. closed desiccator or glove box. The packages were opened only after they had reached ambient temperature to avoid condensing moisture on the glycolide product.

The procedure described in Example 1 was run with 500 gram glycolide charge four times and the purified glycolide was polymerized to PGA. Recoveries were 96-97.6% of starting glycolide, and the results are given in the following Examples 2-5.

EXAMPLES 2-5

Four batches of glycolide were purified in accordance with the procedure described in Example 1 providing yields ranging from 96.0 to 97.6% (see Table). The purified glycolide was packed in multiple layers of heat-sealed laminate bags containing desiccant and these packages were surrounded by dry ice for shipment.

After shipment to a polymerization plant the purified polyglycolide was polymerized to suture-grade PGA using a conventional polymerization procedure.

Results for the purified glycolide and the improved (suture-grade) PGA resulting from the polymerization of the purified glycolide are given in the following Table 1:

TABLE 1

| Example | Glycolide | | | PGA Inherent Viscosity (dl/g) |
|---|---|---|---|---|
| | grams of product | yield % | Melting Point, °C. | |
| 2 | 450 | 96.0 | 81.7-83.0 | 1.37 |
| 3 | 460 | 97.1 | 81.7-83.0 | 1.42 |
| 4 | 460 | 97.6 | 81.2-83.5 | 1.59 |
| 5 | 460 | 96.4 | 81.0-83.7 | 1.46 |

The average yield of the glycolide purified in accordance with the process of the invention was 96.8% and the average inherent viscosity of the PGA resulting from the polymerization thereof was 1.46, thus showing a marked improvement over the 0.8 value for the polymer obtainable from commercially-available glycolide and providing a useful and valuable suture grade polymer.

EXAMPLE 6

A number of glycolides of various purities were purified by the procedure described in Example 1 carried out on a smaller scale. The more impure glycolides required more alumina than 1 part of alumina to 10 parts of glycolide. Alumina to glycolide ratios from 2 to 0.01 were evaluated, and contact times from 1 minutes to 1 hour. Glycolide products giving poly(glycolic acid) (PGA) of inherent viscosities of 1.1 to 1.6 were obtained as a function of treatment conditions. Normally commercially available glycolide at present consistently gives PGA of inherent viscosity 0.8, and can be purified to suture grade monomer (PGA inherent viscosity 1.1-1.6) by a single pass through the above procedure.

The results are set out in the following Table 2. Batch numbers 2, 9, 18, 20, 24, 26 and 28 are untreated samples included for comparison purposes.

TABLE 2

| Glycolide treated with alumina[a] in methylene chloride[b] solution. | | | | | |
|---|---|---|---|---|---|
| Batch No. | Wt. Glycolide g. | Wt. Alumina g. | Slurry time min. | yield % | $\eta$inh | glycolide source[c] |
| 1. | 25.0 | 25.0 | 1 | 92.7 | 1.50 | A |
| 2. | — | untreated | — | — | 0.82 | A |
| 3. | 20.0 | 20.0 | 1 | 95.5 | 1.28 | A |
| 4. | 20.0 | 10.0 | 20 | 95.3 | 1.61 | A |
| 5. | 20.0 | 20.0 | 5 | 88.7 | 1.39 | A |
| 6. | 20.0 | 40.0 | 1 | 80.7 | 1.42 | A |
| 7. | 20.0 | 40.0 | 20 | 79.4 | 1.57 | A |
| 8. | 25.0 | 25.0 | 5 | 85.9 | 1.18 | B |
| 9. | — | untreated | — | — | 0.25 | B |
| 10. | 25.0 | 6.25 | 20 | 97.2 | 1.28 | A |
| 11. | 25.0 | 6.25 | 20 | 96.4 | 1.40 | A |
| 12. | 25.0 | 6.25 | 20 | 97.3 | 1.43 | A |
| 13. | 40.0 | 10.0 | 60 | 95.8 | 1.42 | A |
| 14. | 25.0 | 2.5 | 40 | 98.5 | 1.39 | A |
| 15. | 25.0 | 0.25 | 20 | 99.4 | 1.12 | A |
| 16. | 25.0 | 0.25 | 60 | 99.3 | 1.10 | A |
| 17. | 25.0 | 2.5 | 30 | 98.6 | 1.30 | A |
| 18. | — | untreated | — | — | 0.75 | A |
| 19. | 25.0 | 2.5 | 30 | 99.0 | 0.5 | C[d] |
| 20. | — | untreated | — | — | 0.33 | C |

TABLE 2-continued

Glycolide treated with alumina[a] in methylene chloride[b] solution.

| Batch No. | Wt. Gly- colide g. | Wt. Alumina g. | Slurry time min. | yield % | ηinh | glycolide source[c] |
|---|---|---|---|---|---|---|
| 21. | 25.0 | 12.5 | 20 | 93.7 | 1.16 | C |
| 22. | 25.0 | 25.0 | 20 | 90.5 | 1.34 | C |
| 23. | 25.0 | 2.5 | 30 | 99.2 | 1.28 | D |
| 24. | — | untreated | — | — | 0.98 | D |
| 25. | 25.0 | 2.5 | 30 | 99.0 | 1.34 | E |
| 26. | — | untreated | — | — | 0.95 | E |
| 27. | 25.0 | 2.5 | 30 | 98.7 | 1.23 | F |
| 28. | — | untreated | — | — | 0.81 | F |

Notes for Table 2:
[a]Alumina source: Woelm Pharma, neutral, Activity I: —
For Batches 1-9: Dried at about 300° C. at $10^{-5}$ torr vacuum for about 3 hours.
For Batches 10-28: Dried at about 120° C. at normal atmospheric pressure for two days.
[b]Methylene chloride distilled from calcium hydride for Batches 1-7, 10 and 13-16.
Methylene chloride passed through alumina column (100 g.) for Batch 11.
Methylene chloride used as received (reagent grade Fisher) for Batches 12, 19, 21-23, 25 and 27.
[c]Glycolide source:
A: Boehringer - Ingelheim, Sample No. A
B: Pfizer Inc.
C: Boehringer - Ingelheim, Sample No. B
D: Boehringer - Ingelheim, Sample No. C
E: DuPont, Sample No. E
F: Boehringer - Ingelheim, Sample No. D
[d]Glycolide evaluated after partial use of the sample giving anomalous result.

EXAMPLE 7

This Example illustrates a procedure for polymerizing glycolide to form PGA.

5.00 grams of glycolide were placed in a dried (125° C. >1 hour) heavy wall glass tube (about 1.5 cm internal diameter, about 25 cm long, sealed at one end) under a dry atmosphere (drying agent: anhydrous calcium sulfate). 1.00 cc of a catalyst solution consisting of 0.0100 grams $SnCl_2.2H_2O$ and 0.550 g dodecyl alcohol in 100 cc ethyl ether was added to the glycolide in the tube; care being taken to introduce all the catalyst solution into the glycolide and not running down the walls of the tube. This gave 20 ppm $SnCl_2.2H_2O$ and 1100 ppm dodecyl alcohol in the glycolide. The tube was sealed and transferred to a vacuum line where it was exhausted to about 0.1 torr, evaporating the ether. The tube was then flushed with prepurified nitrogen four times, exhausted and sealed while under vacuum with an oxygen flame. The sealed tube was placed in an oil bath at 220° C. for 2 hours. After two hours, the tube was withdrawn, the oil wiped from the outside and, while still very hot, the tube was placed in a beaker containing liquid nitrogen. After about 5 minutes, most of the glass was broken off and the solid polymer recovered. The polymer was stored in a desiccator after vacuum drying at about 40° C.

The inherent viscosity of the polymer was measured in hexafluoroisopropanol solution at 0.1 deciliter per gram concentration at 30.00° C. following the conventional procedure for dilute solution viscosity measurement of polymers as cited in Collins, Barnes and Billmeyer, *Experiments in Polymer Science*, Wiley-Interscience, New York.

EXAMPLE 8

In this Example comparative tests were conducted to show that the quality of the glycolide, as expressed by the inherent viscosity of the PGA prepared by the polymerization thereof, is degraded if the glycolide is kept in contact with alumina too long.

The results of the comparative tests are set out in the following Table 3.

TABLE 3

| Alumina[1]: Contact time | Glycolide[2] Weight glycolide g. | Inh. visc. | M.P. °C. | Remarks |
|---|---|---|---|---|
| 1 minute | 4.45 | 1.06 | 82.0–83.5 | crystalline |
| 1 hour | 3.89 | 0.80 | 81.0–83.5 | crystalline |
| 3 hours | 4.53 | 0.60 | 80.0–82.5 | crystalline |
| 7 hours | 4.66 | 0.37 | 76.0–78.8 | crystalline |
| 1 day | 4.66 | 0.29 | 76.0–79.8 | crystalline |
| 2 days | 4.73 | 0.25 | 75.8–79.8 | crystalline |
| 3 days | 4.71 | 0.23 | 76.0–79.0 | tacky |
| 6 days | 4.07 | — | 76.0–79.0 | tacky |
| 6 days recrystallized[4] | 1.80 | 0.22 | 82.0–83.0 | | in wt. ratio of 1:1 in THF solution[3]

[1]Dried at 300° C. under vacuum, 3 hours,
[2]Boehringer-Ingleheim Source. PGA ηinh untreated = 0.81
[3]50 g glycolide, 50.0 g. alumina (basic) and 500 cc. THF.
[4]Recrystallization solvent THF/tert-butylmethyl ether(TBME).

The results in Table 3 show that the inherent viscosity of the PGA falls as the contact time of glycolide with alumina increases, except for the first test at one minute.

We claim:

1. A process for the purification of glycolide which comprises dissolving the glycolide to be purified in a suitable organic solvent, adding alumina to the resulting solution to form a slurry wherein the alumina is in intimate contact with the dissolved glycolide, stirring the slurry under controlled conditions for a period of 1 to 60 minutes, and filtering to remove the alumina, evaporating to remove the solvent and recording the purified glycolide.

2. A process according to claim 1, in which the ratio of glycolide to alumina is from 1:0.01 to 1:10, by weight and said controlled conditions are such that the amount of alumina used is correlated to the contact time.

3. A process according to claim 1, in which the organic solvent is methylene chloride.

4. A process according to claim 1, in which the organic solvent is tetrahydrofuran.

5. A process according to claim 1, in which the steps are conducted under a dry inert atmosphere.

6. A process according to claim 5, in which the inert atmosphere is nitrogen.

7. A process for the purification of glycolide according to claim 1, which comprises dissolving about one part by weight of the glycolide to be purified in methylene chloride, adding to the resulting glycolide solution about 0.1 part by weight of granulated alumina and stirring the resultant slurry for about 30 minutes, filtering to remove the alumina, evaporating the methylene chloride and drying the wet, purified glycolide so obtained under vacuum at a temperature of 45° to 50° C.

8. A process according to claim 7, in which the complete process is conducted under a dry inert atmosphere.

9. A process according to claim 8, in which the inert atmosphere is nitrogen.

10. A process for the production of suture-grade polyglycolic acid which comprises polymerizing the purified glycolide prepared by the process according to claim 1.

* * * * *